United States Patent
Kim

(10) Patent No.: US 9,641,383 B2
(45) Date of Patent: May 2, 2017

(54) METHOD FOR ERROR DIAGNOSIS OF CAN COMMUNICATION

(71) Applicant: CONTINENTAL AUTOMOTIVE GMBH, Hannover (DE)

(72) Inventor: Hyunseok Kim, Gyeonggi-do (KR)

(73) Assignee: Continental Automotive GmbH, Hannover (DE)

( * ) Notice: Subject to any disclaimer, the term of this patent is extended or adjusted under 35 U.S.C. 154(b) by 298 days.

(21) Appl. No.: 14/412,756

(22) PCT Filed: Jun. 27, 2013

(86) PCT No.: PCT/EP2013/063473
§ 371 (c)(1),
(2) Date: Jan. 5, 2015

(87) PCT Pub. No.: WO2014/005914
PCT Pub. Date: Jan. 9, 2014

(65) Prior Publication Data
US 2015/0195124 A1    Jul. 9, 2015

(30) Foreign Application Priority Data
Jul. 3, 2012  (KR) .................. 10-2012-0072453

(51) Int. Cl.
*G06F 11/00*      (2006.01)
*H04L 12/24*     (2006.01)
(Continued)

(52) U.S. Cl.
CPC .............. *H04L 41/065* (2013.01); *H04L 1/20* (2013.01); *H04L 12/40032* (2013.01);
(Continued)

(58) Field of Classification Search
CPC . H04L 2012/40215; H04L 2012/40273; H04L 2012/40208; G01R 31/3193; G01R 31/3195; G06F 11/0793
See application file for complete search history.

(56) References Cited

FOREIGN PATENT DOCUMENTS

DE    10160348 A1    6/2003
DE    10240669 A1    3/2004

*Primary Examiner* — Bryce Bonzo
*Assistant Examiner* — Jeison C Arcos
(74) *Attorney, Agent, or Firm* — Laurence A. Greenberg; Werner H. Stemer; Ralph E. Locher

(57) ABSTRACT

In a method for error diagnosis of CAN communication, the rolling counter values stored in the main electronic and sub-electronic control devices are compared with each other. When a rolling counter difference value lies within the predetermined error diagnosis reservation range, the determination on the error diagnosis for the corresponding CAN communication is reserved. When the accumulated number of the error diagnoses reaches the predetermined number for the error diagnosis determination as the rolling counter difference value departs from the error diagnosis reservation range, an error is determined. When the rolling counter values of the main electronic and the sub-electronic control devices match each other, the error diagnosis for the CAN communication is normal, in which case, even if the temporary signal delay phenomenon (that is, the Jitter) occurs in the CAN communication, an erroneous diagnosis of the error for the CAN communication can be efficiently interrupted.

6 Claims, 2 Drawing Sheets

(51) Int. Cl.
*H04L 12/40* (2006.01)
*H04L 12/26* (2006.01)
*H04L 29/08* (2006.01)
*H04L 1/20* (2006.01)

(52) U.S. Cl.
CPC .......... *H04L 41/0631* (2013.01); *H04L 43/06* (2013.01); *H04L 67/12* (2013.01); *H04L 2012/40215* (2013.01)

METHOD FOR ERROR DIAGNOSIS OF CAN COMMUNICATION

BACKGROUND OF THE DISCLOSURE

1. Field of the Disclosure

The present disclosure relates to a method for an error diagnosis of can communication, and more particularly to a method in which a temporary signal delay which can occur in can communication between a main electronic control device receiving data and a sub-electronic control device transmitting the data is prevented from being misjudged as a can communication error.

2. Description of the Prior Art

As generally known in the art, a lot of electronic parts and a plurality of electronic control devices for controlling the electronic parts are included in vehicles. Can communication is mainly used for exchanging data between the electronic control devices.

Data transferred through the can communication corresponds to data used in vehicle operations, and is important in a safe operation of vehicles. Accordingly, it is necessary to diagnose whether or not errors for the data transferred through the can communication occur.

According to the related art, rolling counters are installed in a main electronic control device (for example, Engine Control Unit (ECU)) receiving data through a can communication and a sub-electronic control device (for example, Transmission Control Unit (TCU)) transmitting data through the can communication, and whenever the can communication is performed, the counters of the main electronic and the sub-electronic control devices performing the can communication increase rolling counter values by a value of 1.

In the related art, the rolling counters of the main electronic and the sub-electronic control devices verify whether or not accumulated counter values match each other every can communication, and when it is identified through the verified result that the counter values match each other, it is determined that the can communication is normally performed.

On the other hand, when it is identified through the verified result that the counter values do not match each other, it is determined that an error has occurred in the can communication.

In this case, when it is determined that an error has occurred in the can communication, data for a can message which is subject to determination is not valid, and its existence is not secured.

Moreover, a temporary signal delay phenomenon (for example, a Jitter) may occur in the can communication, in which case, when the temporary signal delay phenomenon (for example, the Jitter) occurs, even though the can communication is normally performed between the electronic control devices in the vehicles, it may be determined that an error of the can communication occurs.

That is, although the can communication is actually normally performed, it is concluded that the error of the can communication occurs, so data for normally transferred can messages is not valid.

SUMMARY OF THE DISCLOSURE

Accordingly, the present disclosure has been made to solve the above-mentioned problems occurring in the prior art, and an object of the present disclosure is to provide a method for an error diagnosis of can communication, in which the rolling counter values stored in the main electronic and sub-electronic control devices are compared with each other, when the rolling counter difference value is within the predetermined error diagnosis reservation range, the determination on the error diagnosis for the corresponding can communication is reserved, when the accumulated number of the error diagnoses reaches the predetermined number for the error diagnosis determination as the rolling counter difference value departs from the error diagnosis reservation range, it is determined that the error of the can communication occurs, and when the rolling counter values of the main electronic and the sub-electronic control devices match each other, it is determined that the error diagnosis for the can communication is normal.

In order to accomplish this object, there is provided a method for an error diagnosis of can communication based on a rolling counter difference value between a main electronic control device and a sub-electronic control device, the method includes: comparing rolling counter values of the main electronic control device and the sub-electronic control device in an error diagnosis device; and determining continuation or reservation of an error diagnosis for a can message through determining whether or not the rolling counter difference value is within a predetermined error diagnosis reservation range from a comparison result.

Preferably, the determining of the continuation or the reservation includes reserving a determination of the error diagnosis for the can message when the rolling counter difference values is within the predetermined error diagnosis reservation range.

Preferably, the method further includes increasing and accumulating the number of the error diagnoses when the rolling counter difference values departs from the predetermined error diagnosis reservation range; and determining the continuation of the error diagnosis for the can message based on the accumulated number of the error diagnoses.

Preferably, the method further includes, when the accumulated number of the error diagnoses for the can communication is not higher than or equal to a predetermined number for an error diagnosis decision, matching the rolling counter value of the main electronic control device with the rolling counter value of the sub-electronic control device, and repeatedly executing the reservation of the error diagnosis in the error diagnosis device.

Preferably, the method further includes, when the number of the error diagnoses for the can communication is higher than or equal to a predetermined number for an error diagnosis decision, determining an error occurrence for the can communication in the error diagnosis device.

Preferably, the method further includes matching the rolling counter value of the main electronic control device with the rolling counter value of the sub-electronic control device, or updating a counterpart rolling counter value to any one of the rolling counter values of the main electronic control device and the sub-electronic control device, and matching the rolling counter values.

According to embodiments of the present disclosure, the rolling counter values stored in the main electronic and sub-electronic control devices are compared with each other, when the rolling counter difference value is within the predetermined error diagnosis reservation range, the determination on the error diagnosis for the corresponding can communication is reserved, when the accumulated number of the error diagnoses reaches the predetermined number for the error diagnosis determination as the rolling counter difference value departs from the error diagnosis reservation range, it is determined that the error of the can communication occurs, and when the rolling counter values of the main electronic and the sub-electronic control devices match each other, it is determined that the error diagnosis for the can communication is normal, whereby, even if the temporary signal delay phenomenon (that is, the Jitter) occurs in the can communication, an erroneous diagnosis of the error for the can communication can be efficiently interrupted.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
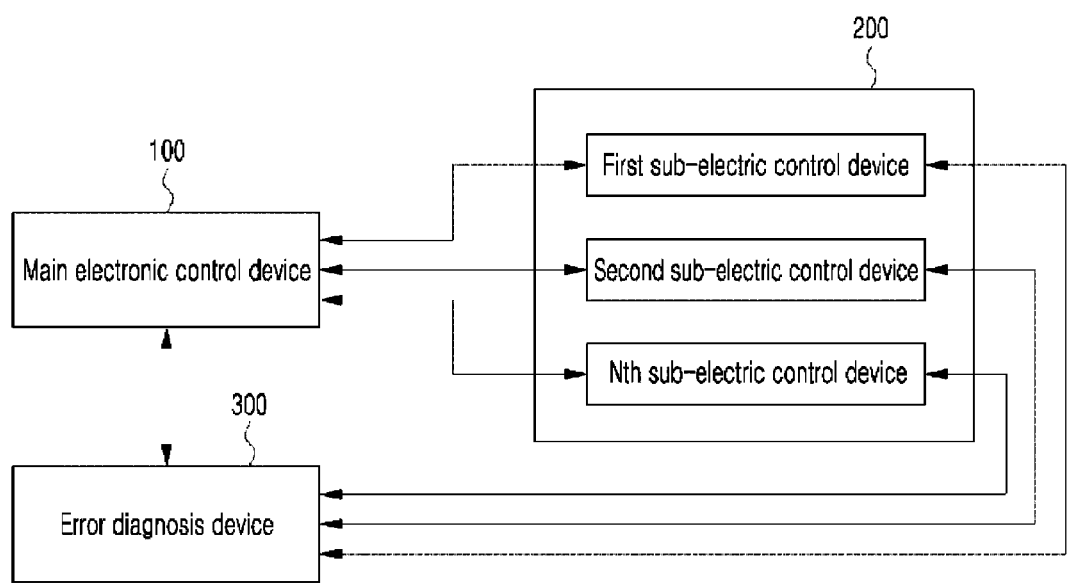
FIG. 1 is a block diagram showing a system for an error diagnosis of can communication according to an embodiment of the present disclosure.

Hereinafter, a system for an error diagnosis of can communication according to embodiments of the present disclosure will be described in more detail with reference to the accompanying drawings. In the following description and drawings, the same reference numerals are used to designate the same or similar components, and so repetition of the description on the same or similar components will be omitted.

FIG. 1 is a block diagram showing a system for an error diagnosis of can communication according to an embodiment of the present disclosure. As shown only as an example in FIG. 1, the system for the error diagnosis of the can communication may be configured to include a main electronic control device 100 such as an Engine Control Unit (ECU), and a sub-electronic control device 200 such as a Transmission Control Unit (TCU) configured to perform the can communication with the main electronic control device 100 to transmit related data.

Here, an error diagnosing device 300 for an error diagnosis of the can communication may be realized through the main electronic control device 100, or a separate device other than the main electronic control device 100 and one or more sub-electronic control devices.

In the embodiment shown in FIG. 1, the error diagnosing device 300, realized through the separate device other than the main electronic control device 100 and the one or more sub-electronic control devices, will be described.

When commencing the error diagnosis of the can communication between the main electronic control device 100 and the sub-electronic control device 200, the error diagnosing device 300 may be provided with rolling counter values for transmission and reception of the corresponding can message from the main electronic control device 100 and the sub-electronic control device 200.

A time point of commencing the error diagnosis of the can communication may be set as a time point of a vehicle start-up in view of the fact that a vehicle should be operated by exchanging the related data between the electronic control devices through the can communication.

Moreover, the error diagnosing device 300 is configured to compare the rolling counter values provided from the electronic control devices 100 and 200, and preferably is configured to reserve a determination on the error diagnosis of the corresponding can communication when a rolling counter difference value between the rolling counter values of the main electronic control device 100 and the sub-electronic control device 200 is within a predetermined error diagnosis reservation range in the compared result.

The error diagnosis reservation range for the counter difference value may be set as a specific numerical value range (for example, 1 to 3) or a specific single numerical value (for example, 1).

For example, when the error diagnosis reservation range for the counter difference value is set as a specific single numerical value of 1, although the sub-electronic control device 200 should be configured to increase a counter value for transmission of a specific can message by while generating and transmitting the specific can message to the main electronic control device 100, and the main electronic control device 100 should be configured to increase a counter value for reception of the specific can message by 1 while receiving the specific can message which the sub-electronic control device 200 has transmitted, a temporary signal delay phenomenon (that is, a Jitter) of the can communication occurs so that the reception of the specific can message which the sub-electronic control device 200 has transmitted may be delayed.

At this time, as the reception of the specific can message which the sub-electronic control device 200 has transmitted is delayed, the main electronic control device 100 fails to increase the counter value for the reception of the specific can messages which the sub-electronic control device 200 has transmitted by 1.

That is, since the error diagnosing device 300 is provided with the counter value of 1 for the sub-electronic control device 200 and the counter value of 0 for the main electronic control device 100, it can be seen that the counter difference value corresponds to a value of 1 when comparing the counter values.

Since the error diagnosis reservation range for the counter difference value has been set as a specific single numerical value of 1 in the above-described embodiment, when it is identified that the counter difference value corresponds to the value of 1, it may be determined that the counter difference value is within the error diagnosis reservation range.

When it is determined that the counter difference value is within the error diagnosis reservation range for the corresponding can communication, preferably, the error diagnosing device 300 is configured to reserve an error diagnosis determination for the corresponding can communication once, and is further configured to identify next can communication to determine the error diagnosis.

Here, when the counter difference value between the counter value of the main electronic control device 100 and the counter value of the sub-electronic control device 200 is maintained as the value of 1 even in the next can communication, the error diagnosing device 300 may be configured to identify that the counter value of the main electronic control device 100 is normally increased by 1, and the counter value of the sub-electronic control device 200 is also normally increased by 1, and may be configured to determine that the corresponding can communication between the main electronic control device 100 and the sub-electronic control device 200 is normally performed.

On the other hand, when the counter difference value between the counter value of the main electronic control device 100 and the counter value of the sub-electronic control device 200 is not maintained as the value of 1, and is increased to a value of 2 in the next can communication, the error diagnosing device 300 may be configured to determine that there is a possibility of an error as the counter difference value departs from the error diagnosis reservation range.

At this time, in a case where the counter difference value departs from the error diagnosis reservation range, the error diagnosing device 300 may be configured to definitely diagnose that an error has occurred, and in a case where the error diagnosing device 300 wants to more accurately perform the error diagnosis, whenever the counter difference value departs from the error diagnosis reservation range, the error diagnosing device 300 additionally is configured to count the number of the error diagnoses, and if the number of the error diagnoses is higher than or equal to a predetermined number for determination of the error diagnosis, may be configured to determine that the error has occurred for the first time.

Moreover, when it is identified that the counter difference value between the counter value of the main electronic control device 100 and the counter value of the sub-electronic control device 200 is higher than or equal to a limiting counter difference value, whereby the number of the error diagnoses is increased by 1, preferably, the error diagnosis device 300 is configured to match the counter values of the main electronic control device 100 and the sub-electronic control device 200 which are configured to perform the can communication, and then are continuously configured to perform an error diagnosis for the next can communication.

Here, the reason why the error diagnosis device 300 has matched the counter values of the main electronic control device 100 and the sub-electronic control device 200 which are configured to perform the can communication is because of initialization of determination values accumulated through performing the previous error diagnosis in order to depart from a determination loop in which the error diagnosis is being performed, much more accurately performing an error diagnosis which will progress in a next turn.

That is, the rolling counter values of the main electronic control device 100 and the sub-electronic control device 200 which are configured to perform the can communication may be reset to match each other, and any one of the rolling counter values of the main electronic control device 100 and the sub-electronic control device 200 which are configured to perform the can communication may be updated to a rolling counter value of a counterpart electronic control device to match each other.

Figure 2:
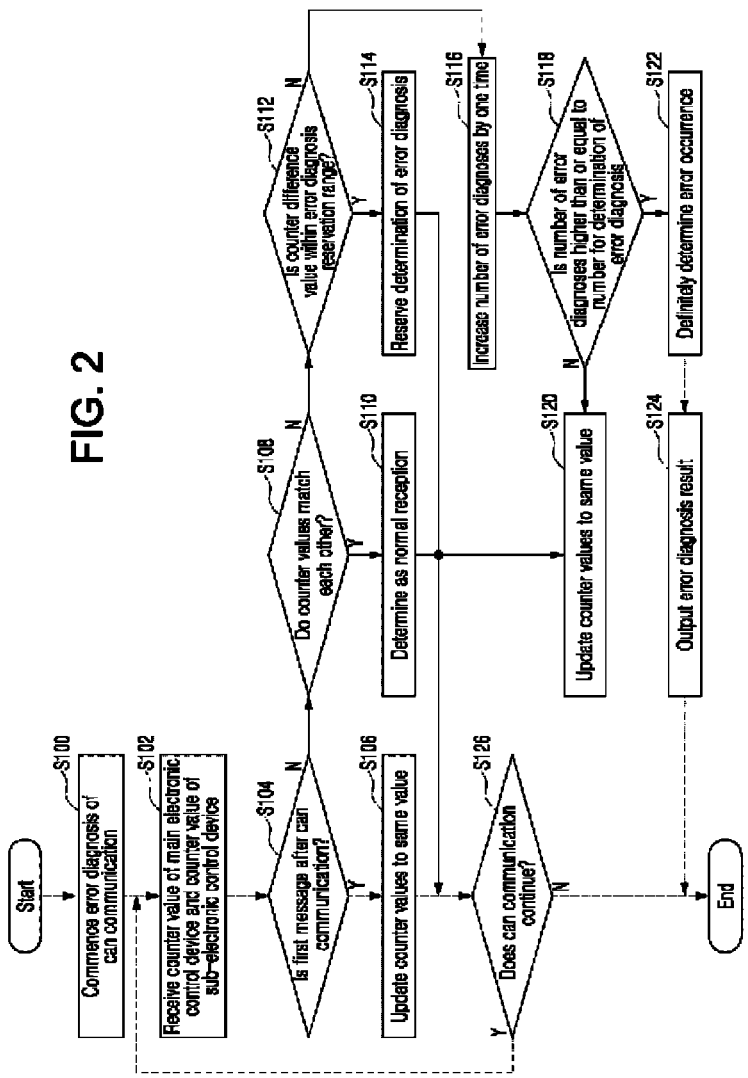
FIG. 2 is a flowchart showing a process of operating the system for the error diagnosis of the can communication shown in FIG. 1.

FIG. 2 is a flowchart showing a process of operating the system for the error diagnosis of the can communication shown in FIG. 1. As shown only as an example in FIG. 2, in a method for an error diagnosis of can communication, when can communication is performed between a main electronic control device 100 and a sub-electronic control device 200 after an error diagnosis device 300 is configured to commence an error diagnosis of the can communication, the error diagnosis device 300 may be provided with a rolling counter value of the main electronic control device 100 from a rolling counter of the main electronic control device 100, and may be provided with a rolling counter value of the sub-electronic control device 200 from a rolling counter of the sub-electronic control device 200 (S100 and S102).

After the error diagnosis device 300 is configured to commence the error diagnosis of the can communication, it is determined whether or not a can message transferred between the main electronic control device 100 and the sub-electronic control device 200 corresponds to first transferred message (S104).

When it is determined in step S104 that the can message corresponds to first transferred message, since a counter difference value is sure to be within an error diagnosis reservation range, the error diagnosis device 300 is configured to reserve a determination on the error diagnosis, and is configured to execute an update such that the rolling counter value of the main electronic control device 100 and the rolling counter value of the sub-electronic control device 200 are configured to match each other as a same value (S106).

When it is determined in step S104 that the can message does not correspond to a first transferred message, the error diagnosis device 300 is configured to perform a determination process of comparing the rolling counter value of the main electronic control device 100 with the rolling counter value of the sub-electronic control device 200 (S108).

When it is determined in step S108 that the rolling counter value of the main electronic control device 100 and the rolling counter value of the sub-electronic control device 200 match each other, the error diagnosis device 300 is configured to determine that the corresponding can communication is normally received (S110).

When it is determined in step S108 that the rolling counter value of the main electronic control device 100 and the rolling counter value of the sub-electronic control device 200 do not match each other, the error diagnosis device 300 is configured to determine whether or not the counter difference value is within a predetermined error diagnosis reservation range (S112).

When it is determined in step S112 that the counter difference value is within the predetermined error diagnosis reservation range, the error diagnosis device 300 is configured to reserve a determination on the error diagnosis for the corresponding can communication, and then additionally is configured to examine an error diagnosis which will progress in a next turn to determine whether or not an error occurs (S114).

When it is determined in step S112 that the counter difference value departs from the predetermined error diagnosis reservation range to be higher than or equal to a limiting counter difference value, the error diagnosis device 300 is configured to determine that there is a possibility of the error diagnosis, increasing the number of the error diagnoses by one time (S116).

Thereafter, it is preferably determined whether or not the increased number of the error diagnoses is higher than or equal to a predetermined number for an error diagnosis determination (S118).

When it is determined in step S118 that the number of the error diagnoses is not higher than or equal to the predetermined number for the error diagnosis decision, since it is not yet certain that the error occurs, when additionally performing an error diagnosis for a next turn, the error diagnosis device 300 is configured to execute an update such that the rolling counter value of the main electronic control device 100 and the rolling counter value of the sub-electronic control device 200 match each other (S120).

When it is determined in step S118 that the number of the error diagnoses is higher than or equal to the predetermined number for the error diagnosis decision, the error diagnosis device 300 is definitely configured to determine that the error has occurred, outputting an error diagnosis result regarding this (S122 and S124).

In addition, when the can communication is continuously performed after step S106, step S110, step S114, or step S120, the error diagnosis device 300 is configured to repeatedly perform an error diagnosis through the above-mentioned processes for can communication which will be performed in a next turn (S126).

Although exemplary embodiments of the present disclosure have been described as shown above, it will be understood that various modifications and variations can be made by those skilled in the art to which the present disclosure pertains without departing from the spirit and scope of the present disclosure described in the below claims.

As shown above, in the method for the error diagnosis of the can communication, the rolling counter values stored in the main electronic and sub-electronic control devices are compared with each other, when the rolling counter difference value is within the predetermined error diagnosis reservation range, the determination on the error diagnosis for the corresponding can communication is reserved, when the accumulated number of the error diagnoses reaches the predetermined number for the error diagnosis determination as the rolling counter difference value departs from the error diagnosis reservation range, it is determined that the error of the can communication occurs, and when the rolling counter values of the main electronic and the sub-electronic control devices match each other, it is determined that the error diagnosis for the can communication is normal, whereby, even if the temporary signal delay phenomenon (that is, the Jitter) occurs in the can communication, an erroneous diagnosis of the error for the can communication can be efficiently interrupted. In a case of applying the method for the error diagnosis of the can communication to vehicles, very great advances can be made in the aspects of the error diagnosis of the can communication, there can be good chance of marketing and a business of the applied vehicles, and the method can be actually clearly carried out with great industrial availability.

The invention claimed is:

1. A method for an error diagnosis of CAN communication based on a rolling counter difference value between rolling counter values of a main electronic control device and a sub-electronic control device, the method comprising:
    comparing rolling counter values of the main electronic control device and the sub-electronic control device in an error diagnosis device to arrive at a comparison result; and
    determining continuation or reservation of an error diagnosis for a CAN message through determining whether or not the rolling counter difference value lies within a predetermined error diagnosis reservation range from the comparison result.

2. The method according to claim 1, wherein the determining of the continuation or the reservation comprises reserving a determination of the error diagnosis for the CAN message when the rolling counter difference value lies within the predetermined error diagnosis reservation range.

3. The method according to claim 1, further comprising:
    increasing and accumulating a number of the error diagnoses when the rolling counter difference values departs from the predetermined error diagnosis reservation range; and
    determining the continuation of the error diagnosis for the CAN message based on the accumulated number of the error diagnoses.

4. The method according to claim 3, further comprising, when the accumulated number of the error diagnoses for the CAN communication is not higher than or equal to a predetermined number for an error diagnosis decision,
    matching the rolling counter value of the main electronic control device with the rolling counter value of the sub-electronic control device, and
    repeatedly executing the reservation of the error diagnosis in the error diagnosis device.

5. The method according to claim 3, further comprising:
    when the number of the error diagnoses for the CAN communication is higher than or equal to a predetermined number for an error diagnosis decision, determining an error occurrence for the CAN communication in the error diagnosis device.

6. The method according to claim 4, further comprising:
    matching the rolling counter value of the main electronic control device with the rolling counter value of the sub-electronic control device; or
    updating a counterpart rolling counter value to any one of the rolling counter values of the main electronic control device and the sub-electronic control device, and matching the rolling counter values.

* * * * *